United States Patent [19]

Kiske

[11] Patent Number: 4,788,860
[45] Date of Patent: Dec. 6, 1988

[54] HOT-WIRE SENSOR FOR INTEGRALLY MEASURING MATERIAL OR VOLUME FLOWS

[75] Inventor: Siegfried Kiske, Gross Grönau, Fed. Rep. of Germany

[73] Assignee: Drägerwerk Aktiengesellschaft, Lübeck, Fed. Rep. of Germany

[21] Appl. No.: 88,690

[22] Filed: Aug. 24, 1987

[30] Foreign Application Priority Data

Sep. 6, 1986 [DE] Fed. Rep. of Germany ....... 3630427

[51] Int. Cl.$^4$ .............................................. G01F 1/68
[52] U.S. Cl. ................................................. 73/204.27
[58] Field of Search ......................................... 73/204

[56] References Cited

U.S. PATENT DOCUMENTS

| Re. 30,105 | 10/1979 | Rodder | 73/204 |
| 1,156,600 | 10/1915 | Berg | 73/204 |
| 3,464,269 | 9/1969 | Froger | 73/204 |
| 3,709,035 | 1/1973 | DeFries | 73/204 |
| 4,294,114 | 10/1981 | Lauterbach | 73/204 |
| 4,326,412 | 4/1982 | Kobayashi et al. | 73/204 |
| 4,523,461 | 6/1985 | Watkins | 73/204 |

FOREIGN PATENT DOCUMENTS

| 1523270 | 7/1973 | Fed. Rep. of Germany . |
| 2505689 | 12/1977 | Fed. Rep. of Germany . |
| 2729743 | 1/1979 | Fed. Rep. of Germany . |

Primary Examiner—Herbert Goldstein
Attorney, Agent, or Firm—Walter Ottesen

[57] ABSTRACT

A hot-wire sensor integrally measuring material or volume flows in a conduit must be so configured that an integral average velocity can be determined. This takes into account the variable velocity distribution along the radius. To achieve the foregoing, the hot wire either is installed opposite the longitudinal axis of the conduit or has a thickness which changes symmetrically with respect to the longitudinal axis of the conduit with the portions of larger thickness being disposed near the inner wall surface of the conduit.

2 Claims, 1 Drawing Sheet

HOT-WIRE SENSOR FOR INTEGRALLY MEASURING MATERIAL OR VOLUME FLOWS

FIELD OF THE INVENTION

The invention relates to a hot-wire sensor for the integral measurement of material or volume flows in a conduit wherein at least one hot wire is mounted having a diameter which is small relative to the conduit diameter.

BACKGROUND OF THE INVENTION

Hot-wire sensors are utilized in various arrangements. For example, German published patent application DE-OS No. 27 29 743 discloses an arrangement for measuring the flow velocity of gases and German Pat. No. 25 05 689 discloses an arrangement for measuring the heat conductivity of a gas mixture. From the measurement of the velocity at a predetermined location in a conduit, it is possible to determine the material or volume throughput. This then is possible with a higher accuracy when the ratio of the measured velocity to the averaged flow rate is a constant or is at least a known function of the measured quantity. However, in order to achieve this condition, either very long stabilization intervals or intense constrictions of the flow channel or other arrangements are necessary for producing a uniform flow. These arrangements in general cause additional flow losses.

An arrangement for measuring the velocity and direction of a gas flow, especially for determining the vertical velocity of aircraft, is already known from the German published patent application DE-AS No. 15 23 270. In this configuration the measuring probe consists of two freely-supported windings each having the shape of a truncated cone. The windings are superposed at their smaller longitudinal end faces. The windings are utilized as resistance sensors in an electrical bridge circuit.

SUMMARY OF THE INVENTION

It is an object of the invention to provide hot-wire sensors which make it possible to take adequate account of the velocity distribution in a flow channel having a preferably circular cross section for integrating the velocity distribution and thus making possible a precise measurement of material or volume flows in conduits.

In a circular conduit with a radius R, the spatial average velocity of a rotationally symmetrical flow is determined from the relationship:

$$\bar{u}_{real} = \frac{1}{\pi R^2} \int_0^R u(r) \cdot 2\pi r dr = 2 \cdot \int_0^1 u\left(\frac{r}{R}\right) \cdot \frac{r}{R} \cdot \frac{dr}{R} \quad (1)$$

wherein: $u(r)$ is the velocity u as a function of the radius r; and, $\bar{u}_{real}$ is the average velocity over the total radius R which can be used, for example, as a basis for calculating the volume throughput.

Integration of a thin cylindrical hot wire arranged in a circular conduit provides:

$$u_{meas} = 2 \int_0^1 u\left(\frac{r}{R}\right) \cdot \cos\alpha \cdot \left(\frac{r}{R}\right) \cdot \frac{dr}{R} \quad (2)$$

Here $\alpha(r)$ designates an r-dependent angle between the flow vector and the hot wire. By equating (2) and (1), a determining equation for the placement angle $\alpha$ is obtained:

$$\cos\alpha = r/R \text{ or, } \alpha = \text{arc-cos } r/R$$

This relationship permits hot-wire sensors to be configured which make possible an integral determination of an average velocity value characterizing rotationally-symmetrical flow.

For the reasons advanced above, the hot-wire sensor according to the invention is configured so that the hot wire is placed opposite the longitudinal axis of the conduit. The term "placed" expresses in this context that the hot wire or its length segments lying in a radial plane have a constant placement angle with respect to the longitudinal axis of the conduit or a placement angle which changes vis-a-vis the longitudinal axis of the conduit for each length segment. This configuration permits a precise measurement of the average flow velocity, from which various further measured quantities such as the volume flow can be derived by calculation with known parameters.

According to a preferred embodiment of the invention, the hot-wire sensor has two segments placed symmetrically with respect to the longitudinal axis of the conduit which conjointly define a point in the region of the longitudinal axis of the conduit. In this embodiment, the hot wire can be appropriately built-up of straight segments or of segments that are curved over their entire lengths.

The component segments can be so advantageously shaped that they have a shape which at least approximately corresponds to the arc-cos function relative to the longitudinal axis of the conduit. In lieu of a single hot wire, several hot wires can be appropriately arranged with respect to each other in angular positions of the radial planes in the flow cross section.

In the case of rotationally-symmetrical velocity distribution in a flow conduit, the hot-wire sensor derived from the arc-cos rule is so positioned against the flow that it has respectively different sensitivities for each successive segmental length with these sensitivities being dependent upon the radius and proportional to the through-flow area element $2\pi \cdot r \cdot dr$. In this way, the hot-wire sensor integrates the flow profile according to the area. It is unimportant in this context whether one deals with a parabola-shaped, hyperbola-shaped, or another type of flow profile, so long as only a rotationally-symmetrical velocity distribution is present.

The hot-wire sensor also gives the correct volume throughput when the flow is higher around the periphery than in the central region. The measurement criterion of the hot-wire sensor of the invention thus is not the flow velocity alone, but the throughput area portion traversed by the flow vectors.

The basic principle of the invention is seen in that the hot-wire sensor has a larger placement angle in the region near the walls and this placement angle extends up to a position perpendicular to the longitudinal axis of the conduit. Because of this arrangement, the hot-wire sensor is more strongly influenced by the flow in the region near the conduit wall surface than in the center region of the longitudinal axis of the conduit where the placement angle is smaller (up to the parallel position with respect to the longitudinal axis of the conduit) and represents the effect of the smaller flow-through area in this region.

The regions near the wall surface of the conduit with their larger through-flow areas exert a stronger influence on the hot wire than do the regions along the longitudinal axis of the conduit wherein smaller through-flow area components are present. Starting with this same consideration, an alternate embodiment according to the invention is achieved by configuring the hot wire to have different thicknesses in symmetrical relationship with the center axis of the conduit, the portions of greater thickness being disposed in the region near the conduit wall.

In this way, with the aid of thick portions, a stronger effect will be obtained through the portions of the flow in the region near the wall, while the thin mid portions respond in a correspondingly insensitive manner.

It is also effective to arrange several hot wires at different angular positions within the cross section of the conduit.

In general, the embodiment comprising a hot wire placed opposite the longitudinal axis of the conduit and having a uniform diameter appears to be technically easier to reduce to practice.

The principle described above is preferably applied to a conduit of circular cross section, but if required, and with approximately similar results, the invention can be applied to cornered and other symmetrical cross sections.

By utilizing the features of the invention, a hot wire is obtained which, with an overall simple configuration, provides a good integrating effect over the velocity distribution present in the conduit cross section and therefore provides an average velocity as the measured value which permits a precise integral measurement of material or volume flows.

BRIEF DESCRIPTION OF THE DRAWING

The invention will now be described with reference to the drawing wherein.

DESCRIPTION OF THE PREFERRED EMBODIMENTS OF THE INVENTION

Figure 1:
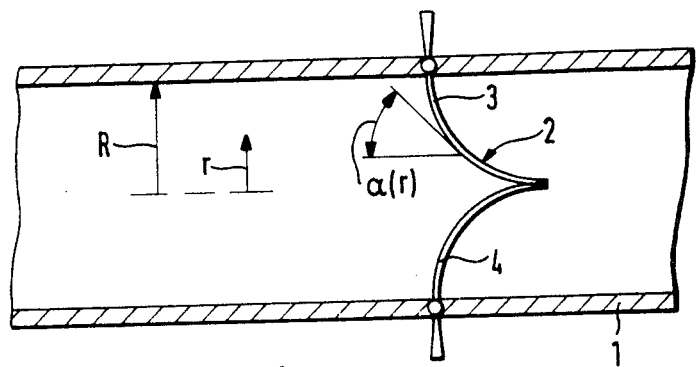
FIG. 1 is an elevation view, partially in section, taken through a conduit of circular cross section with a hot wire placed therein; and, FIG. 2 is an elevation view, partially in section, of a conduit of circular cross section equipped with a hot-wire sensor according to another embodiment of the invention wherein the sensor has different thicknesses.

Referring to FIG. 1, a hot wire 2 is mounted in a conduit having a circular cross section. The hot wire 2 comprises two curved segments (3, 4) connected to each other. The curved segments (3, 4) are mounted so as to be symmetrical with respect to the longitudinal axis of the conduit and are joined to conjointly define a point in the region of this axis. The position of this point can be appropriately directed in the direction of the flow. However, an alternate embodiment is nevertheless also possible with the point directed against the direction of the flow. The segments (3, 4) are curved approximately so that the shape of the arc-cos function will be realized.

The conduit inner radius R and the radius r of a length element of the segment 3 disposed at an angle $\alpha$ are shown.

Figure 2:
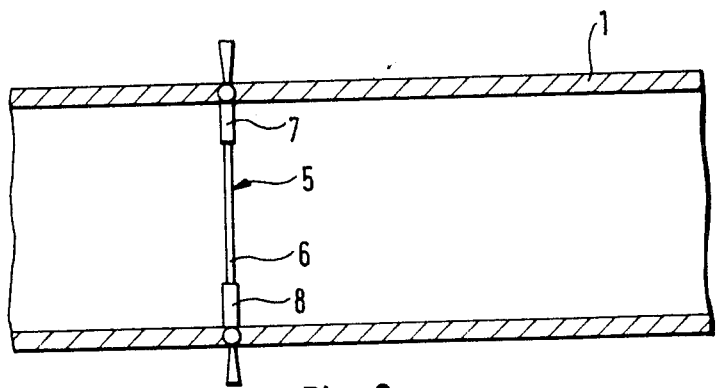

In the embodiment according to FIG. 2, a hot wire 5 is located inside a conduit 1 having a circular cross section. The hot wire includes a mid portion 6 of a predetermined thickness and two end portions (7, 8) near the wall having thicknesses greater than the thickness of the mid portion.

It is understood that the foregoing description is that of the preferred embodiments of the invention and that various changes and modifications may be made thereto without departing from the spirit and scope of the invention as defined in the appended claims.

What is claimed is:

1. A hot-wire sensor for integrally measuring material or volume of a flow in a conduit having a conduit wall and a predetermined conduit diameter and defining a longitudinal axis, the flow having a maximum velocity at said longitudinal axis and a velocity which approaches zero at the inner surface of the conduit wall, the hot-wire sensor comprising:

at least one hot wire having a diameter which is small in relationship to said conduit diameter and having a predetermined length with first and second ends; and, said hot wire being placed in said conduit so as to have said first end substantially tangent to said axis and to extend outwardly and away from said axis toward said wall in a curve of continuously and ever increasing slope so as to cause said second end of said hot wire to be at the region of the inner surface of the wall.

2. A hot-wire sensor for integrally measuring material or volume of a flow in a conduit having a conduit wall and a predetermined conduit diameter and defining a longitudinal axis, the flow having a maximum velocity at said longitudinal axis and a velocity which approaches zero at the inner surface of the conduit wall, the hot-wire sensor comprising:

two symmetrical wire segments placed in said conduit so as to have respective first ends substantially tangent to said axis;

said wire segments being connected together at said first ends to conjointly define a point in the region of said axis; and, each of said wire segments extending outwardly and away from said axis toward said wall in a curve having a shape corresponding approximately to an arc cosine function.

* * * * *

UNITED STATES PATENT AND TRADEMARK OFFICE
CERTIFICATE OF CORRECTION

PATENT NO. : 4,788,860

DATED : December 6, 1988

INVENTOR(S) : Siegfried Kiske

It is certified that error appears in the above-identified patent and that said Letters Patent is hereby corrected as shown below:

In column 1, line 53: delete "$u_{real}$" and substitute -- $\bar{u}_{real}$ -- therefor.

In column 1, line 64: delete "$u_{meas}$" and substitute -- $\bar{u}_{meas}$ -- therefor.

Signed and Sealed this

Fifteenth Day of August, 1989

Attest:

DONALD J. QUIGG

*Attesting Officer*  *Commissioner of Patents and Trademarks*